United States Patent [19]

Laborie

[11] 4,433,630

[45] Feb. 28, 1984

[54] DESK AND PANEL STRUCTURES HAVING BRISTLE-COVERED ACCESS TO THE INTERIORS THEREOF

[76] Inventor: Robert Laborie, 7, rue Mariotte, 75Q17 Paris, France

[21] Appl. No.: 339,564

[22] Filed: Jan. 15, 1982

[51] Int. Cl.³ .................. H02G 3/28; A47B 35/00
[52] U.S. Cl. .................................. 108/50; 160/351; 174/48
[58] Field of Search ............ 108/50; 52/829, 220, 52/730; 312/223; 160/351, 135; 174/48, 65 R, 65 SS

[56] References Cited

U.S. PATENT DOCUMENTS

| | | | |
|---|---|---|---|
| 3,836,936 | 9/1974 | Clement | 174/48 X |
| 3,955,298 | 5/1976 | Kapstad | 160/135 X |
| 4,021,973 | 5/1977 | Hegg | 160/351 X |
| 4,094,561 | 6/1978 | Wolff et al. | 312/223 |
| 4,213,493 | 7/1980 | Haworth | 160/351 |
| 4,255,610 | 3/1981 | Textoris | 174/48 |
| 4,308,417 | 12/1981 | Martin | 174/35 GC |
| 4,354,052 | 10/1982 | Albany et al. | 174/48 |

Primary Examiner—William E. Lyddane
Assistant Examiner—Peter A. Aschenbrenner
Attorney, Agent, or Firm—Michael H. Wallach; Robert F. Rotella

[57] ABSTRACT

A panel having bristle-covered access to the interior thereof and a desk having bristle-covered grooves is disclosed. The panel is comprised of a panel frame made up of panel frame assembly members which function both to retain the panel faces within the frame and to orient and retain the bristles over the access areas of the panel. An elastic material may be substituted for the bristles to achieve a similar effect.

12 Claims, 6 Drawing Figures

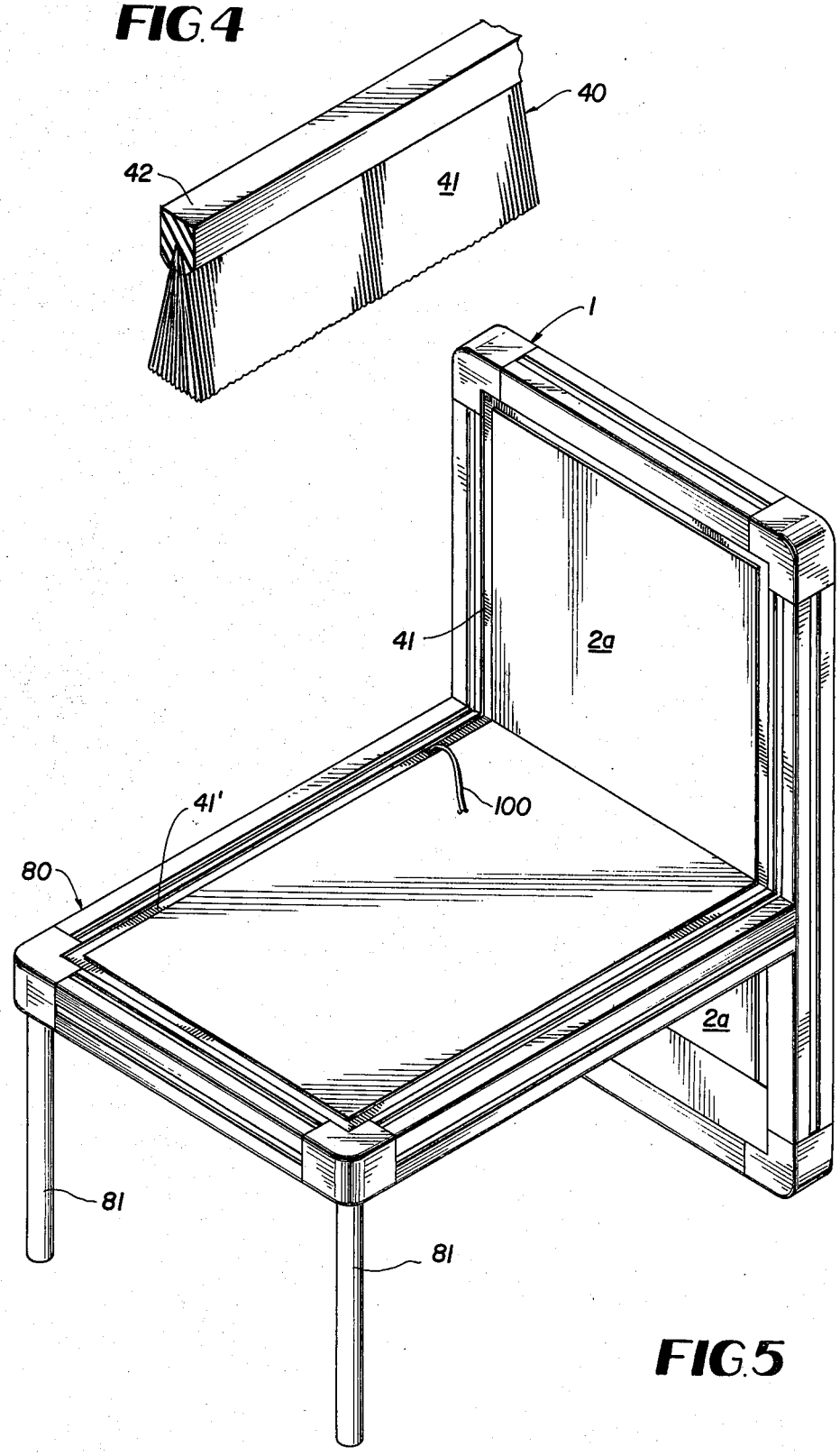

DESK AND PANEL STRUCTURES HAVING BRISTLE-COVERED ACCESS TO THE INTERIORS THEREOF

BACKGROUND OF THE INVENTION

1. Field of the Invention

The present invention is directed to panels, walls desks or the like which are comprised of novel brush-covered conduits readily accessible from both within and outside such structures.

2. Description of the Prior Art

The prior art has recognized the desirability of nonintrusive, aesthetically pleasing wire access systems for both desks/tables and wall panels.

An example of a recent patent relating to such a wiring enclosure system for use in connection with desks is U.S. Pat. No. 4,094,561.

Recent examples of patents disclosing the use of partition, wall and panel wiring enclosure systems providing wherein access to concealed wires is provided are U.S. Pat. Nos. 4,034,626; 4,239,932; 4,255,610; 4,257,203 and the patents cited therein.

SUMMARY OF THE INVENTION

In accordance with the invention, yet another means for accomplishing the objective of providing a readily accessible desk and/or panel associated wiring enclosure system has been developed.

The invention herein provides a desk or panel system which allows for contiguous pathways for wiring through and/or around the entire panel/desk and further provides an integrated desk and panel system which has contiguous, totally accessible pathways for wiring and the like running between, around and through the desk and panel.

The overall panel structure in its broadest aspect relates to a panel providing access to concealed wiring. The panel comprises a rectangular panel frame formed by interconnecting an elongated upper horizontal frame member assembly, two elongated vertical frame member assemblies and a lower elongated horizontal frame member assembly. An interior sidewall is formed by the opposing inwardly facing sides of the elongated upper and lower horizontal frame member assemblies and of the vertical frame member assemblies. Two parallel and spaced-apart rectangular face sheets interconnected along the periphery thereof by panel face attaching members situated between the panel face sheets and extending out from the edges thereof are retained within the panel frame by attachment of the panel face attaching members to a channel on the interior sidewall of the panel frame. Brush strip retaining channels on the inwardly facing sides of one or more of the upper, lower and vertical frame member assemblies extend lengthwise along such inwardly facing sides proximate one edge of the interior sidewall. A panel face attaching member retaining channel securing the panel face attaching members extending beyond the edges of the panel face sheets to the opposing inwardly facing sides of the upper, lower and vertical frame member assemblies extends lengthwise on the central portion of the inwardly facing sides of the upper, lower and vertical frame member assemblies. A brush strip, comprised of a brush retaining back and brush material, secured within at least one brush strip retaining channel of at least one frame member assembly, with the brush material extending out from the channel to the opposing edge of the rectangular face sheet forms a means for accessing wiring concealed by said brushes.

It is possible to combine with the aforesaid panel a table attached thereto and having a brush material-covered groove on a surface thereof. The brush material-covered groove and the brush material extending out from a vertical frame member assembly brush retaining channel are located to form a contiguous accessible pathway between the panel and table. The pathway is concealed by the brush material of the panel and table.

In the foregoing embodiment of the invention, as well as the other embodiments illustrated, an elastic member such as a flexible strip may be substituted for the brush strip.

In the embodiment of the invention relating to a panel providing access to concealed wiring situated therein, the panel is comprised of a rectangular panel frame formed by interconnecting an elongated upper horizontal frame member assembly, two elongated vertical frame member assemblies and a lower elongated horizontal frame member assembly at the far corners of the rectangular frame. An interior sidewall is formed by the opposing inwardly facing sides of the upper, lower and vertical frame member assemblies. Within the panel frame, two parallel and spaced-apart rectangular face sheets are attached along the periphery thereof by panel face attaching members placed between the panel face sheets. The panel face attaching members extend out from the edges of the face sheets. One set of brush strip retaining channels are formed on the inwardly facing sides of the upper, lower and vertical frame member assemblies. These channels extend lengthwise along the inwardly facing sides near one edge of the interior sidewall. Another set of brush strip retaining channels are formed on the inwardly facing sides of the upper, lower and vertical frame member assemblies. These channels extend lengthwise along the inwardly facing sides near the other edge of the interior sidewall. A third channel, secures the panel face attaching members extending beyond the edges of the panel face sheets to the opposing inwardly facing sides of the upper, lower and vertical frame member assemblies. This third channel extends lengthwise along the inwardly facing sides of the upper, lower and vertical frame member assemblies. substantially parallel to and between the first and second brush strip retaining channels. The brush strips, which are comprised of a brush retaining back and brush material, are secured with at least one of the first and/or second brush strip retaining channels of one or more of the frame member assemblies, with the brush material extending out from the channel(s) to the opposing edge of the rectangular face sheet(s) to form a means for accessing wiring within the panel which is concealed by said brushes.

In another embodiment of the invention, brush strips are secured within the first and second brush strip retaining channels of the upper frame member assembly and both vertical frame member assemblies. The brush material extends out from these channels to the opposing edges of the rectangular face sheets to form, on both sides of the panel, a brush-covered means of access through which wiring concealed within the panel may be withdrawn. The brush-covered area of the panel surface is aesthetically pleasing and offers a practical means of access at any point along the brush strip.

Yet another embodiment of the invention involves the use of panel face attaching member(s) at the bottom of the panel which extend out from the edges of the bottom panel face sheets a greater distance than the other face attaching members secured to the upper and vertical face member assemblies. In this manner, a large raceway is formed below the bottom panel face sheets. This raceway is concealed by covers, suitably of the snap fit type, fitted between the bottom horizontal edges of the face sheets and the opposing brush strip retaining channels.

In the embodiment of the invention relating to an integrated panel and table system, a table is attached to the panel, which table has a brush material-covered groove on either the working surface or the bottom surface thereof. The brush material-covered groove is normal to and abuts and/or is substantially adjacent to the brush material extending out from a vertical frame member assembly brush retaining channel, to form a contiguous accessible pathway between the panel and table, said pathway being concealed by the brush material of the panel and table.

In the aspect of the invention pertaining to the rectangular panel frame, a rectangular panel frame comprising an elongated upper horizontal frame member assembly, two elongated vertical frame member assemblies and a lower elongated horizontal frame member assembly, forms an interior sidewall which is defined by the opposing inwardly facing sides of the elongated upper and lower horizontal frame member assemblies and of the vertical frame member assemblies. The inwardly facing sides/surfaces of the upper horizontal frame member assembly and said vertical frame assemblies have: (1) first brush strip retaining channels extending lengthwise thereon, proximate one edge of the segment of the interior sidewall formed by said upper horizontal frame member assembly and said vertical frame member assemblies; (2) second brush strip retaining channels extending thereon, proximate the other edge of the segment of the interior sidewall formed by said upper horizontal frame member assembly and said vertical frame member assemblies; and (3) a panel securing channel for retaining a panel within said panel frame, said panel securing channel extending lengthwise on the inwardly facing sides of the upper horizontal and two vertical frame member assemblies, substantially parallel to and intermediate the first and second brush strip retaining channels.

In its broadest aspect, the invention pertains to an elongated panel frame member in a panel frame within which a panel face is retained by securing same within said panel frame. The elongated panel frame member has on the panel face retaining surface thereof: (1) a first brush strip retaining channel, extending longitudinally along the panel face retaining surface, proximate one longitudinally extending edge thereof; (2) a second brush strip retaining channel, extending longitudinally along the panel face retaining surface, proximate the other longitudinally extending edge thereof; and (3) a third channel for securing the panel face which channel extends longitudinally along the panel face, substantially parallel to and intermediate the first and second brush strip retaining channels. A brush strip is secured within the first and/or second brush strip retaining channels.

This brush strip is suitably comprised of a brush retaining back and bristle-containing brush material. The brush material extends out from the brush strip retaining channel with the ends of the bristles of said brush material defining a plane substantially parallel to the panel face retaining surface.

The bristles/fibers of which the brush material is comprised are preferably made of nylon but may be made of other well-known materials suitable for brush fibers.

BRIEF DESCRIPTION OF THE DRAWINGS

FIG. 4 is a perspective view illustrating the brush strip structure.

FIG. 5 is a perspective view illustrating the integrated panel and table system.

DETAILED DESCRIPTION OF THE DRAWINGS

Figure 1:
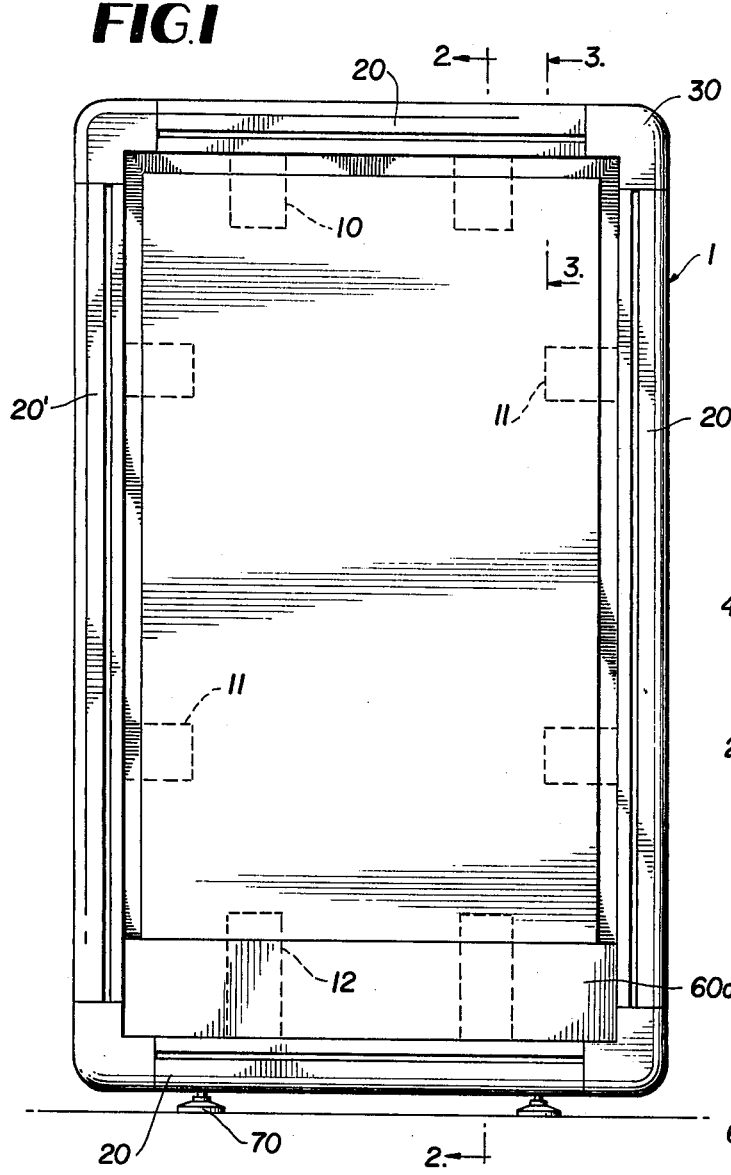
FIG. 1 is a side view illustrating the panel structure and disposition of the panel face attaching members.

Referring now to the drawings, especially FIG. 1, it wil be noted that panel 1 is comprised of two parallel spaced-apart panel face sheets 2a and 2b interconnected by upper horizontal panel face attaching members 10, vertical panel face attaching members 11 and bottom horizontal panel face attaching members 12. (In the drawings, like parts bear the same numerals.) The panel face sheets are in turn attached to vertical frame member assemblies 20 and top and bottom horizontal frame member assemblies 20' by means of the face attaching members 10, 11 and 12. As a result of this arrangement, the panel face sheets 2a and 2b are retained within and supported by horizontal and vertical frame member assemblies 20 and 20'.

The frame member assemblies are connected at the four corners of the panel by frame member assembly connecting means 30. Connection may be effected in any well-known manner. In the embodiment of the invention illustrated, tracks 31 run lengthwise on the exterior exposed surfaces of the frame member assemblies. Track portions 31 have inturned flanges 32 within which locking elements of various fixtures or certain types of frame member assembly connecting means may be secured.

The frame member assemblies may be typically produced by extrusion and such assemblies may be hollow or solid depending on individual requirements or preference.

Figure 2:
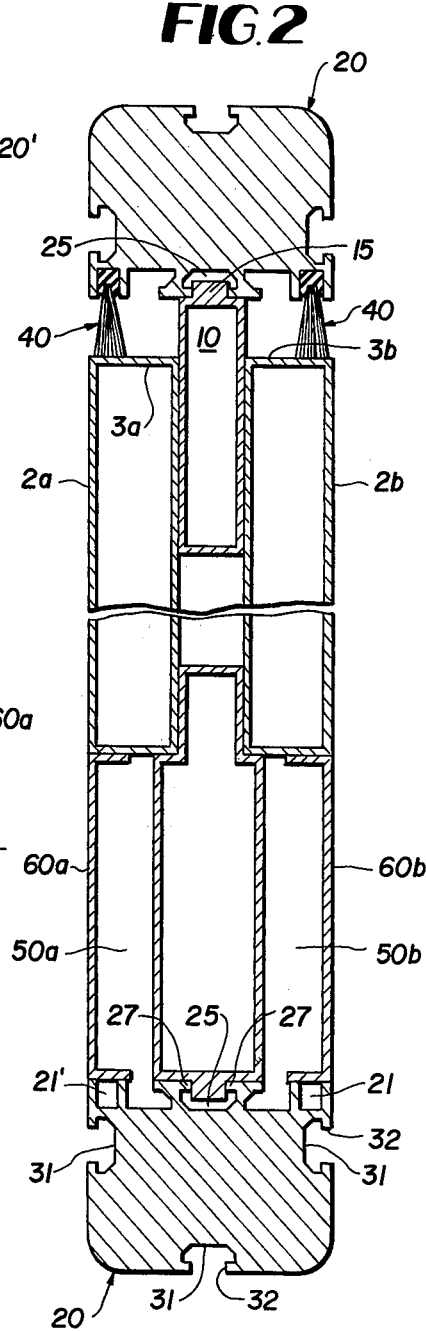
FIG. 2 is a vertical section view taken along line 2—2 of FIG. 1.
Figure 3:
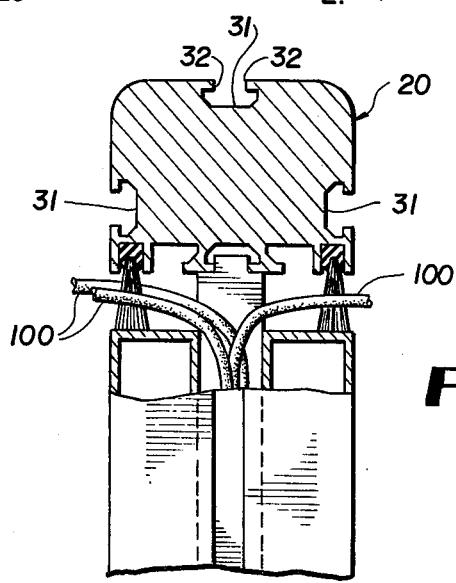
FIG. 3 is a vertical section view taken along line 3—3 of FIG. 1.

As best illustrated in FIGS. 2 and 3, the horizontal frame member assemblies have three parallel longitudinally extending channels 21, 21' and 25 on the inwardly facing side thereof.

Channel 21 is a brush strip retaining channel and runs longitudinally, proximate the one edge of frame member assembly 20; and, Channel 21', another brush strip retaining channel, runs longitudinally proximate the other edge of frame member assembly 20.

Intermediate the two brush strip retaining channels is the panel face attaching member retaining channel 25 described in greater detail hereinafter. Depending on panel face thickness and the required width of conduits running horizontally and/or vertically along on either side of the panel, the panel face attaching member retaining channel may be closer to one or the other of the channels 21 or 21'. However, for most purposes, and in the embodiment of the invention illustrated by the drawings, the panel face attaching member retaining channel 25 is centrally located generally parallel to and equidistant from each of brush strip retaining channels 21 and 21'.

As shown best in FIG. 1, the panel face attaching members 10, 11 and 12 are spaced apart from one another along the periphery of the panel face sheets. As specifically illustrated in FIGS. 2 and 3, panel face attaching members 10 extend out from the top edges 3a and 3b of the panel face sheets. Panel face attaching members 11 and 12 likewise extend out from the other edges of the panel sheets. Each of the panel face attaching members is adapted to be secured to the central portion of the appropriate frame member assemblies. As best illustrated in FIGS. 2 and 3, this may be accomplished where the frame member assembly has a channel 25, disposed intermediate the two brush strip retaining channels 21 and 21'. Suitably, the channel is formed by flanges 26, which preferably have longitudinally extending ribs or beads 27 on the inner faces thereof, said ribs or beads typically being in opposed relation as shown.

The outermost portion of the panel face attaching member 15 extending beyond the edges of the panel face sheets fits within channel 25 and is retained thereby longitudinally extending ribs 27.

The brush strip 40 is comprised of brush material 41 secured within a brush retaining back 42 (FIG. 4). The brush retaining back is suitably comprised of an elastomericlike material which, when compressed and inserted into longitudinally extending channels 21 and/or 21' of the frame member assembly, remains in the channel without the requirement of additional mechanical retaining means or the use of an adhesive.

The brush material 41 secured within the brush retaining back 42 may be comprised of bristles of natural origin or filaments or fibers of synthetic composition. Representative of suitable synthetic compositions are the fiber-forming polymeric materials including polyamides of the nylon family.

When the brush retaining back is inserted in channels 21 and/or 21', the bristles/fibers of the brush strip extend outwardly from the brush retaining back in a direction substantially normal to the longitudinally extending channels 21 and/or 21'. Note that a cross section of the brush strip indicates a brush arrangement wherein the exterior bristles diverge somewhat outwardly (FIG. 4). The bristles/fibers extend towards and generally are in contact with the edges of the panel face sheets (FIGS. 2 and 3).

Referring to FIG. 2, the panel face attaching member portion extending beyond the edges 3a and 3b of panel faces 2a and 2b and the brush strip 40 are sized so that when the panel face attaching member is secured within channel 25 and the brush strip back 42 is secured within the longitudinally extending brush strip channels, the brush tips of brush strips 40 contact the edges of the opposed panel faces 3a and 3b.

It is also suitable to attach another brush strip on the panel face sheet edge, parallel to the brush strip secured within the frame member assembly in such a manner that the brushes of the two respective brush strips are interengaged; however, for simplicity of design, ease of replacement and aesthetic reasons, the use of a single brush strip as illustrated is to be preferred.

As also illustrated by reference to FIG. 2, brush strips form an accessible enclosed conduit extending the length and/or width of the panel face sheet. Moreover, as best illustrated in FIG. 3, fabricating the panel from two parallel spaced apart panel face sheets interconnected with panel attaching members which (1) are spaced apart from one another along the periphery of the panel face sheets; (2) extend out from the edges of the panel face sheets; and, (3) are secured to the central portion of the frame member assemblies, creates a large volume within the panel through which wires 100 or cables, etc. can be passed and accessed along selected peripheral portions of the panel via displaceable brush elements.

Referring to FIGS. 1 and 2, raceways 50a and 50b are formed along the bottom portion of panel 1. The height of such raceways is defined by panel face attaching member(s) 12 and hence may be varied by increasing or decreasing the length of the panel face attaching members extending beyond the bottom horizontal edge of the panel face sheets 2a and 2b.

The raceways 50a and 50b are accessible from either panel face by means of releaseably secured covers 60a and 60b. These covers are suitably snap fit into position, and when secured, permit access to the open space between the panel face sheets.

At the bottom of the panel on the bottom frame member assembly, leveling feet 70 may suitably be attached (FIG. 1).

In FIG. 5 an integrated table and panel combination is illustrated. In this embodiment of the invention, the table has grooves on the top surface accessibly by means of the groove covering displaceable brushes 41' of a brush strip which is secured within such grooves suitably by brush strip retaining channels such as illustrated for the panel construction heretofore described.

Referring further to FIG. 5, the table 80 is suitably attached perpendicular to the panel 1. The brushes of the panel 41 and the table 41' form a contiguous accessible pathway whereby wires and/or cables or the like can be passed from the panel to the table and readily accessed at any locus along the brush strips of either the panel or desk. At the end of the table, remote from the panel 1, legs 81 are attached.

Although the table illustrated is fabricated in similar fashion to the panel, the table need not be of the same or similar structure. For example, the grooves of table 80 may be formed within a solid piece and need not be situated proximate each of the three edges as illustrated. However, in accordance with this embodiment of the invention, at least one brush strip should be so situated within a groove of the table normal to the panel such that a contiguous accessible pathway covered by the bristles/filaments of the panel and table is provided.

Yet another embodiment of the invention relates to provision of a groove within a table, preferably on the working surface thereof, the groove being covered by the accessible through the bristles of a brush strip comprising brush material secured within a brush retaining back and attached to a wall of the groove—suitably in a channel, proximate and substantially parallel to the plane of the table working surface. The bristles/fibers of the brush strip extend across the groove outwardly from the brush retaining back into contact with the opposing wall of the groove. The bristles/fibers of the table and the panel depicted are secured in such a manner that, when in position, the bristles do not extend above the plane of the table working surface or beyond the plane defined by the exterior of the panel. Further, in this regard, the end of the bristles in contact with the groove or channel preferably are substantially in the same plane whereby conformity and ease of displacement and recovery is achieved.

The above-detailed description represents the preferred embodiment of the invention and various changes and alterations can be made without departing from the spirit and broader aspects of the invention.

It is not intended to limit the invention to the details heretofore recited, the invention being defined by the claims which follow.

I claim:

1. A panel providing access to concealed wiring comprising:
a. a rectangular panel frame formed by interconnecting an elongated upper horizontal frame member assembly, two elongated vertical frame member assemblies and a lower elongated horizontal frame member assembly;
b. an interior sidewall formed by the opposing inwardly facing sides of said elongated upper and lower horizontal frame member assemblies and of said vertical frame member assemblies;
c. two parallel and spaced-apart rectangular face sheets interconnected along the periphery thereof by panel face attaching members situated between said panel face sheets and extending out from the edges thereof;
d. first brush strip retaining channels on the inwardly facing sides of the upper, lower and vertical frame member assemblies; said first brush strip retaining channels extending lengthwise along said inwardly facing sides proximate one edge of the interior sidewall;
e. second brush strip retaining channels on the inwardly facing sides of the upper, lower and vertical frame member assemblies; said second brush strip retaining channels extending lengthwise along said inwardly facing sides proximate the other edge of the interior sidewall;
f. a panel face attaching member retaining channel securing the panel face attaching members extending beyond the edges of the panel face sheets to the opposing inwardly facing sides of the upper, lower and vertical frame member assemblies, said panel face attaching member retaining channel extending lengthwise on the inwardly facing sides of the upper, lower and vertical frame member assemblies, substantially parallel to and intermediate the first and second brush strip retaining channels; and
g. brush strips, comprised of a brush retaining back and brush material, secured within at least one of the first and second brush strip retaining channels of at least one frame member assembly, with the brush material extending out from the channel to the opposing edge of the rectangular face sheets to form a means for accessing wiring concealed by said brushes.

2. The panel of claim 1 further characterized in that the brush strips are secured within the first and second brush strip retaining channels of the upper frame member assembly and each of the two vertical frame member assemblies, with the brush material extending out from said channels to the opposing edges of the rectangular face sheets to form, on both sides of the panel, a brush-covered means for access through which wiring concealed within the panel may be withdrawn.

3. The panel of claim 2 further characterized in that the panel face attaching member at the bottom of the panel extends out from the edges of the bottom panel face sheets a greater distance than the other face attaching members secured to the upper and vertical face member assemblies to form a raceway below the bottom panel face sheets, said raceway being concealed by covers fitted between the bottom horizontal edges of the face sheets and the opposing brush strip retaining channels.

4. The panle of claims 1, 2 or 3 further chracterized in that the brush material is comprised of nylon bristles, the tips of which are in contact with the opposing edges of the rectangular face sheets.

5. In combination with the panel of claims 1, 2 or 3, a table attached to said panel, said table having a brush material-covered groove on a surface thereof, said brush material-covered groove and the brush material extending out from a vertical frame member assembly brush retaining channel, forming a contiguous accessible pathway between the panel and table, said pathway being concealed by the brush material of the panel and table.

6. A panel providing access to concealed wiring comprising:
a. a rectangular panel frame formed by interconnecting an elongated upper horizontal frame member assembly, two elongated vertical frame member assemblies and a lower elongated horizontal frame member assembly;
b. an interior sidewall formed by the opposing inwardly facing sides of said elongated upper and lower horizontal frame member assemblies and of said vertical frame member assemblies;
c. two parallel and spaced-apart rectangular face sheets interconnected along the periphery thereof by panel face attaching members situated between said panel face sheets and extending out from the edges thereof;
d. flexible strip retaining channels on the inwardly facing sides of one or more of the upper, lower and vertical frame member assemblies; said flexible strip retaining channels extending lengthwise along said inwardly facing sides proximate one edge of the interior sidewall;
e. a panel face attaching member retaining channel securing the panel face attaching mebers extending beyond the edges of the panel face sheets to the opposing inwardly facing sides of the upper, lower and vertical frame member assemblies, said panel face attachng member retaining channel extending lengthwise on the central portion of the inwardly facing sides of the upper, lower and vertical frame member assemblies;
f. a flexible strip secured within at least one of the flexible strip retaining channels of at least one frame member assembly, with the flexible strip extending out from the channel to the opposing edge of the rectangular face sheet to form a means for accessing wiring concealed by said flexible strip.

7. The elongated upper horizontal and vertical panel frame members of claim 6 further characterized in that the brush strip within a brush strip retaining channel of each of said upper horizontal and vertical panel frame members is comprised of a brush retaining back and bristle-containing brush material, said brush material extending out from the brush strip retaining channel with the ends of the bristles of said brush material defining a plane substantially parallel to the respective panel face attaching member retaining channel of the respective upper horizontal and vertical panel frame members.

8. The panel of claim 6 further characterized in that the flexible strips are secured within contiguous flexible strip retaining channels of the upper frame member assembly and each of the two vertical frame member assemblies, with the flexible strips extending out from said channels to the opposing edges of the rectangular face sheet to form, on one side of the panel, a flexible material-covered means for access through the which wiring concealed within the panel may be withdrawn.

9. In combination with the panel of claims 6 or 8, a table attached to said panel, said table having a flexible material-covered groove on a surface thereof, said flexible material-covered groove and said flexible material extending out from a vertical frame member assembly flexible material retaining channel, forming a contiguous accessible pathway between the panel and table, said pathway being concealed by the flexible material of the panel and table.

10. A panel providing access to concealed wiring comprising:
   a. a rectangular panel frame formed by interconnecting an elongated upper horizontal frame member assembly, two elongated vertical frame member assemblies and a lower elongated horizontal frame member assembly;
   b. an interior sidewall formed by the opposing inwardly facing sides of said elongated upper and lower horizontal frame member assemblies and of said vertical frame member assemblies;
   c. two parallel and spaced-apart rectangular face sheets interconnected along the periphery thereof by panel face attaching members situated between said panel face sheets and extending out from the edges thereof;
   d. brush strip retaining channels on the inwardly facing sides of one or more of the upper, lower and vertical frame member assemblies; said brush strip retaining channels extending lengthwise along said inwardly facing sides proximate one edge of the interior sidewall;
   e. a panel face attaching member retaining channel securing the panel face attaching members extending beyond the edges of the panel face sheets to the opposing inwardly facing sides of the upper, lower and vertical frame member assemblies, said panel face attaching member retaining channel extending lengthwise on the central portion of the inwardly facing sides of the upper, lower and vertical frame member assemblies;
   f. a brush strip, comprised of a brush retaining back and brush material, secured within at least one brush strip retaining channel of at least one frame member assembly, with the brush material extending out from the channel to the opposing edge of the rectangular face sheet to form a means for accessing wiring concealed by said brushes.

11. The panel of claim 10 further characterized in that the brush strips are secured within contiguous brush strip retaining channels of the upper frame member assembly and each of the two vertical frame member assemblies, with the brush material extending out from said channels to the opposing edges of the rectangular face sheet to form, on one side of the panel, a brush-covered means for access through which wiring concealed within the panel may be withdrawn.

12. In combination with the panel of claims 10 or 11, a table attached to said panel, said table having a brush material-covered groove on a surface thereof, said brush material-covered groove and the brush material extending out from a vertical frame member assembly brush retaining channel, forming a continuous accessible pathway between the panel and table, said pathway being concealed by the brush material of the panel and table.

* * * * *

UNITED STATES PATENT AND TRADEMARK OFFICE
CERTIFICATE OF CORRECTION

PATENT NO. : 4,433,630
DATED : February 28, 1984
INVENTOR(S) : Robert Laborie

It is certified that error appears in the above—identified patent and that said Letters Patent is hereby corrected as shown below:

In Col. 4, line 23, delete "wil" and substitute therefor the word --will--.

In Col. 5, line 11, after the word "panel" insert the word --face--.

In Col. 5, line 24, delete the word "thereby" and insert therefor the words --therein by--.

In Col. 6, line 55, delete "the", first occurrence, and insert --and--.

<u>In the Claims</u>

Claim 4 - in Col. 8, line 6, delete the word "panle" and insert therefor the word --panel--.

Claim 8 - in Col. 9, line 5, delete the word "the".

Signed and Sealed this

Twenty-fifth Day of September 1984

[SEAL]

Attest:

GERALD J. MOSSINGHOFF

*Attesting Officer*  *Commissioner of Patents and Trademarks*